ized by at least one alcoholamine, at least one aminosilane coupling agent, and at least one primary, secondary or tertiary aliphatic monoamine stabilizing agent which is miscible with water and which has a $pK_b$ value lower than the $pK_b$ value of the amine group of the coupling agent, plus 1.

United States Patent [19]

Gasca et al.

[11] Patent Number: 5,470,658
[45] Date of Patent: Nov. 28, 1995

[54] GLASS FIBERS FOR REINFORCING ORGANIC MATRICES

[75] Inventors: Jean-Philippe Gasca, Saint-Jean De La Porte; Gerard Tardy, Grenoble, both of France

[73] Assignee: Vetrotex France, Chambery, France

[21] Appl. No.: 278,957

[22] Filed: Jul. 22, 1994

[30] Foreign Application Priority Data

Jul. 22, 1993 [FR] France .................... 93 09050

[51] Int. Cl.⁶ .................... B32B 9/00; B32B 25/20
[52] U.S. Cl. .................... 428/391; 428/375; 428/378; 428/392; 428/411.1; 428/426; 65/443; 65/448; 524/494
[58] Field of Search .................... 428/375, 391, 428/392, 378; 65/443, 447, 448, 450; 523/527; 524/494

[56] References Cited

U.S. PATENT DOCUMENTS

| | | | |
|---|---|---|---|
| 4,240,944 | 12/1980 | Temple | 428/391 |
| 4,248,935 | 2/1981 | Temple | 428/392 |
| 4,263,082 | 4/1981 | Temple | 428/392 |
| 4,283,322 | 8/1981 | Temple | 428/392 |
| 4,370,157 | 1/1983 | Barch et al. | 428/378 |
| 4,370,439 | 1/1983 | Melle et al. | 428/378 |
| 4,413,085 | 11/1983 | Temple | 428/378 |
| 4,457,970 | 7/1984 | Das et al. | 428/392 |
| 4,608,304 | 8/1986 | Rosthauser | 428/378 |
| 4,728,573 | 3/1988 | Temple | 428/378 |
| 5,130,197 | 7/1992 | Temple | 428/378 |

*Primary Examiner*—Patrick J. Ryan
*Assistant Examiner*—J. M. Gray
*Attorney, Agent, or Firm*—Oblon, Spivak, McClelland, Maier, & Neustadt

[57] ABSTRACT

Glass fibers are coated with a sizing composition comprising an aqueous emulsion based on at least one polyolefin having grafted thereon at least one acid or anhydride which is neutralized by at least one alcoholamine, at least one aminosilane coupling agent, and at least one primary, secondary or tertiary aliphatic monoamine stabilizing agent which is miscible with water and which has a $pK_b$ value lower than the $pK_b$ value of the amine group of the coupling agent, plus 1.

The glass fibers of the invention are intended more particularly for reinforcing polyolefin matrices such as polypropylene matrices.

15 Claims, No Drawings

5,470,658

GLASS FIBERS FOR REINFORCING ORGANIC MATRICES

BACKGROUND OF THE INVENTION

1. Field of the Invention

The present invention relates to glass fibers coated with a sizing composition which is intended to confer on them certain properties, for the purpose of reinforcing organic materials or "organic matrices".

More precisely, the present invention relates to glass fibers which are coated with a suitable sizing composition and are intended for reinforcing thermoplastic matrices such as polyolefin matrices and, more particularly, polypropylene matrices. The present invention also relates to the reinforced products produced.

2. Description of the Background

The capacity of a glass fiber to receive various sizing compositions creating a bond between the glass and the matrix to be reinforced enables the fiber to be associated with numerous polymeric materials in order to produce composite products the properties, particularly mechanical properties, of which are better than those of the non-reinforced polymeric material.

Glass fibers are generally coated with sizing compositions when they are in the form of filaments as they are drawn from the dies, the sizing being intended, in the first place, to ensure bonding between the filaments and to protect the threads produced by the assembly of the filaments against abrasion. At the same time, as indicated above, the sizing promotes adhesion between the glass threads and the materials which they are to reinforce.

In the case of glass fibers which are intended to reinforce thermoplastic matrices such as polyolefin matrices and, particularly, polypropylene matrices, it is known to use sizing compositions based on an emulsion of polyolefins of a nature closely related to that of the polyolefins constituting the matrix to be reinforced. It is also known that the cohesion between the glass fibers and the polyolefin matrices is facilitated by the presence, on the polyolefins of the emulsion, of reactive groups, such as carboxyl groups, which can react with other compounds present in the sizing composition. The presence of grafted polyolefins of this type within the sizing composition is all the more necessary to ensure good glass-matrix bonding as the matrices themselves lack such reactive groups.

In order to improve cohesion between the grafted or non-grafted polyolefin matrices and the glass fibers, it is also known to use, for the reinforcement of the matrices, glass fibers coated with a composition comprising an emulsion of polyolefins onto which acids are grafted, which acids are neutralized by diethylethanolamines, in the presence of at least one aminosilane coupling agent which has a basicity greater than that of the diethylethanolamine and which reacts with the salts of neutralized polyolefins, and also comprising at least one stabilizing agent in the form of a diacid, as well as an adhesive film-forming agent. This composition, which is described in U.S. Pat. No. 5,130,197, generally involves the use of aminosilanes having very reactive amine groups and/or the use of aminosilane in relatively large quantities, this being particularly unfavorable in terms of cost. Moreover, the phenomenon of significant thickening has been noted when the stabilizing agent or the silanes are added over the course of the production of the sizing composition, which thickening may increase with time, or may stabilize, according to circumstances. A need, therefore, continues to exist for a sizing composition which results in improved bonding between glass fibers and polymer matrix.

SUMMARY OF THE INVENTION

Accordingly, one object of the invention is to provide a cheaper and more advantageous solution to the problem of the reinforcement of organic matrices and, in particular, to provide glass fibers coated with a suitable sizing composition, the fibers enabling a good glass-matrix bond to be achieved in the subsequent production of reinforced thermoplastics, particularly of reinforced polyolefins and, more particularly, of reinforced polypropylenes.

Briefly, this object and other objects of the present invention as hereinafter will become more readily apparent can be attained by glass fibers coated with a sizing composition comprising (1) an aqueous emulsion based on at least one polyolefin having grafted thereon at least one acid or anhydride which is neutralized by at least one alcoholamine, (2) at least one aminosilane coupling agent, and (3) at least one primary, secondary or tertiary aliphatic monoamine stabilizing agent which is miscible with water and which has $pK_b$ value lower than the $pK_b$ value of the amine group of the coupling agent plus one.

DETAILED DESCRIPTION OF THE PREFERRED EMBODIMENTS

The sized fibers according to the present invention are prepared by known methods. One such method consists of drawing threads of molten glass in the form of layers of continuous filaments from the holes of one or more dies, and coating the filaments with the sizing composition of the invention before the filaments in question are assembled into one or a plurality of threads. These threads may then be wound onto rotating supports before undergoing other operations, may be distributed on moving conveyors, or may be chopped after formation. The presentation of the sized glass fibers thus varies according to the mechanical characteristics to be achieved in the reinforced products, and according to the methods implemented.

Glass fibers which serve to reinforce thermoplastic matrices of the invention may, in particular, be in the form of continuous threads, rovings, chopped threads, or mats. These fibers are generally dried before being used to reinforce organic matrices, since the water included in the sizing composition may be detrimental to good glass-matrix adhesion.

The polyolefins mentioned above, whether they are polyolefins of the matrices to be reinforced or polyolefins of the emulsions used in the sizing compositions, may be amorphous polyolefins or essentially crystalline polyolefins (atactic, isotactic or syndiotactic), may be homopolymers or copolymers, and may be of higher or lower molecular weight. The polyolefin or polyolefins of the matrix to be reinforced may or may not be grafted polymers and at least one polyolefin of the emulsion mentioned in the definition of the invention has grafted thereon at least one acid or anhydride. Preferably, if the emulsion comprises several polyolefins, most of the polyolefins have grafted thereto at least one acid or anhydride. The acids or anhydrides grafted on the polyolefins may be, in particular, ethylene-substituted carboxylic acids and/or polycarboxylic acids and/or acid anhydrides, such as, for example, maleic, acrylic, methacrylic, itaconic or citraconic acid (or anhydride).

In most cases, the polyolefins of the invention are polyethylenes and/or polypropylenes which, in the case of the polyolefin or polyolefins of the emulsion, preferably have maleic anhydride or maleic anhydrides grafted thereto. Most preferably, the polyolefins of the invention are polypropylenes, mixtures of polypropylenes, or polypropylene derivatives, the polyolefin or polyolefins of the emulsion having grafted thereto maleic anhydride or maleic anhydrides.

The polyolefin or polyolefins of the emulsion mentioned in the definition of the invention act mainly as coupling co-agents with respect to the matrix to be reinforced, and at the same time as adhesive film-forming agents and, possibly, as lubricants. The initial amount of polyolefin(s) within the sizing composition mentioned in the definition of the invention and as deposited on the glass filaments to constitute the fibers of the invention, is preferably between 1 and 10% by weight of the composition, the amount by weight of polyolefin emulsion used to produce the composition clearly being greater than the amount of polyolefin(s) mentioned above, and depending on the emulsion used. Aqueous polyolefin emulsions constitute, in this connection, the most suitable form for treating the surface of the glass. These emulsions are produced by methods such as that described in patent application FR-A-2 044 805 or, for the polyolefins of high molecular weight, by the method described in patent application EP-A-0 394 090. These methods involve, in particular, the mixing of the desired quantity of polyolefin(s) in the presence of a suitable base and of surfactants, under pressure, and at a temperature higher than the melting point of the polyolefins. The base serves to neutralize the acid group or groups carried by the grafted polyolefin or polyolefins, after which suitable surfactants permit the formation of the emulsion of neutralized polyolefin(s), which is then cooled. Suitable bases include alcoholamines such as dimethylaminopropanol, and dimethylethanolamine. As far as the surfactants are concerned, any surfactant commonly used for emulsifying polyolefins may be used.

According to the present invention, the composition which serves to coat the fibers comprises, in addition to the emulsion mentioned above, at least one aminosilane coupling agent. This coupling agent may be, for example, a mono- or di-aminated aminosilane such as a gamma-aminopropyltriethoxysilane or a N-beta-(aminoethyl)-gamma-aminopropyltrimethoxysilane or any other similar aminosilane. It enables the glass fibers coated with the sizing composition to be coupled with the polyolefin matrix which is to be reinforced. The initial amount of aminosilane(s) within the sizing composition mentioned in the definition of the invention and as deposited on the glass filaments which are to constitute the fibers of the invention, is between 0.1 and 2% by weight of the composition and, particularly preferably, between 0.5 and 1.5% by weight of the composition.

The sizing composition which serves to coat the fibers of the invention also comprises at least one stabilizing agent which enables the composition to be stabilized, this agent consisting of a primary, secondary, or tertiary aliphatic monoamine, which is miscible with water and which has a $pK_b$ value lower than the $pK_b$ value of the amine group of the coupling agent, plus one.

"Primary, secondary or tertiary aliphatic monoamine" means, according to the invention, a compound which has a primary, secondary or tertiary amine group and which does not have an aromatic ring. The monoamine stabilizing agent mentioned in the definition of the invention is characterized, in particular, by the fact that it has a basicity greater, or possibly slightly less (within the limits indicated above by means of the $pK_b$ values), than the basicity of the amine group of the coupling agent. The $pK_b$ value of the monoamine stabilizing agent mentioned in the definition of the invention is preferably less than or equal to the $pK_b$ value of the amine group of the coupling agent, plus 0.8 and, particularly preferably, is less than or equal to the $pK_b$ value of the amine group of the coupling agent, that is, it has the same basicity or a basicity greater than the basicity of the amine group of the coupling agent. The use of a stabilizing agent in the form of a basic monoamine such as that mentioned in the definition of the invention offers a very great advantage in comparison with the use of a stabilizing agent such as a diacid, for example, according to U.S. Pat. No. 5,130,197. the advantages consequently achieved are described in particular in the following description.

The monoamine stabilizing agent may consist of an alcoholamine, an alkylamine, an etheramine, or the like, the amine fulfilling the conditions given in the definition of the invention. By way of non-limiting examples, if the coupling agent of the invention is gamma-aminopropyltriethoxysilane, the monoamine stabilizing agent may be N-methylethanolamine, 3-methoxypropylamine, butylamine, or the like, preferably, butylamine, and if the coupling agent is N-beta (aminoethyl) gamma-aminopropyltrimethoxysilane, the monoamine stabilizing agent may be in particular, dimethylaminomethylpropanol, aminomethylpropanol, N-methylethanolamine, 3-methoxypropylamine, butylamine, or the like, and, preferably, N-methylethanolamine, 3-methoxypropylamine or butylamine.

Advantageously, the monoamine stabilizing agent or agents used in the invention are present in excess amounts in relation to the aminosilane coupling agent or agents in the sizing composition, whatever the proportion of the latter within the sizing composition is. An excess of monoamine stabilizing agent in relation to the aminosilane coupling agent in the sizing composition is particularly desirable if the $pK_b$ value of the said stabilizing agent is greater than or equal to the $pK_b$ value of the amine group of the coupling agent. According to the preferred embodiment of the invention, the proportion of amines, in moles, within the sizing composition, this proportion taking into consideration both the alcoholamine or alcoholamines serving as neutralizing bases and the monoamine or monoamines serving as the stabilizing agent, is at least two times greater than that of the aminosilanes. According to a preferred embodiment of the invention, the initial amount of monoamine stabilizing agent(s) in moles within the sizing composition as deposited on the glass filaments which are to constitute the fibers of the invention, is about two times greater than the amount of aminosilane coupling agent(s). Generally, the quantity of monoamine stabilizing agent(s) by weight within the composition is between 0.1 and 2%. It may be assumed, this assumption not limiting the scope of the invention, that, because of the reactivity of the monoamine stabilizing agent(s) used and, where appropriate, the presence of an excess of amines in relation to the coupling agent or agents used, the interaction between the aminosilane coupling agent(s) and the polyolefin(s) of the emulsion at the level of the sizing composition which is to coat the filaments is considerably reduced. The sizing composition which is to coat the glass fibers of the invention is consequently more stable and retains a low viscosity permitting, in particular, its use in methods for the production of sized glass threads which can be used to produce the glass fibers of the invention. The thickening phenomena found particularly in the case of the sizing compositions described in U.S. Pat. No. 5,130,197 are thus reduced in the sizing compositions of the invention.

The monoamine or monoamines used in the invention generally vaporizes at a low temperature (below 150° C.) and is subsequently liberated, either at the moment of drying or during the formation of a composite, thus permitting the creation, at the level of the final composite, of strong interactions between the aminosilane coupling agent(s) and the polyolefin or polyolefins of the matrix. These interactions take place with the intermediate of the grafted polyolefin or polyolefins of the emulsion but, if the polyolefin or polyolefins of the matrix are themselves grafted polymers, may also take place directly at the level of the polyolefin or the polyolefins of the matrix.

The sizing composition coating the fibers of the invention thus permits the production of composites having good mechanical properties, as shown in the following examples. Moreover, because of the small proportion of silane and because of the selection of the stabilizing agent, the sizing composition coating the fibers of the invention is cheaper and, as explained above, does not encounter significant thickening phenomena during its preparation, as is the case with the sizing composition described in U.S. Pat. No. 5,130,197.

The invention also has the advantage of ensuring good filamentary cohesion within the threads without the need, in most cases, of using an adhesive film-forming agent, unlike the sizing composition described in U.S. Pat. No. 5,130,197 and which necessarily contains an adhesive film-forming agent.

This advantage has been found particularly advantageous in the case of chopped threads where the use of the present sizing composition enables chopped threads of a particularly satisfactory integrity to be produced, as shown further in the examples.

The presence of a film-forming agent in the composition coating the fibers of the invention may nevertheless be found advantageous for the production of straight or assembled rovings. The film-forming agent used then preferably consists of a polyurethane, an epoxy polymer, or an epoxy-polyurethane copolymer.

Apart from the compounds mentioned, the sizing composition coating the fibers of the invention may also contain any type of additive normally used in this type of composition and, particularly, a lubricant and/or a wetting agent. The pH of the sizing composition is, in most cases, greater than 9, the solids content of the composition is preferably between 1 and 15%, and the ignition loss on the fibers of the invention is preferably between 0.5 and 1.5% and, particularly preferably, between 0.5 and 1%.

Having generally described this invention, a further understanding can be obtained by reference to certain specific examples which are provided herein for purposes of illustration only and are not intended to be limiting unless otherwise specified.

The following examples show various results obtained for the viscosity, integrity and mechanical properties by comparing the sizing compositions and the matrices reinforced with the aid of the fibers of the present invention with sizing compositions and matrices reinforced with the aid of fibers such as those described in the U.S. Pat. No. 5,130,197, respectively.

EXAMPLE 1

This example provides a comparison of the kinematic viscosities, measured by calibrated capillary tube, at the time of the preparation of sizing compositions comprising an aqueous emulsion based on polypropylene(s) having maleic anhydrides grafted thereto, a mono-aminated aminosilane coupling agent, and a diacid stabilizing agent or a monoamine stabilizing agent, respectively.

The emulsion of polypropylene(s) used (Emulsion A) was an emulsion marketed by National Starch under the name PROTOLUBE RL-5440, an aqueous emulsion comprising polypropylene(s) having maleic anhydride grafted thereto. This emulsion was neutralized by a diethylethanolamine. The coupling agent used (B) was gamma-aminopropyltriethoxysilane, marketed by Union Carbide under the name SILANE A 1100. The diacid stabilizing agent (C) was maleic acid, and the monoamine stabilizing agent (D) was N-methylethanolamine. The various sizing compositions were formulated where necessary, with an epoxy-polyurethane copolymer marketed by Shell U.S. (CMD-W 60-5520) so as to have a uniform solids content of about 5%, for each composition, this copolymer not affecting the viscosity.

The proportions given in the following table are the percentages by weight of the products A, B, C or D introduced into the sizing composition, the complementary percentage representing the water added. The actual proportions by weight of the active compounds resulting from each of these products within the sizing composition are indicated in brackets, the products B, C and D being pure, but the product A comprising both the active compounds investigated and water.

The proportion of diacid stabilizing agent was of the order of the proportions indicated in U.S. Pat. No. 5,130,197 for this agent, that of the monoamine stabilizing agent being selected in accordance with the present invention.

|  | Compositions | | | | | |
| --- | --- | --- | --- | --- | --- | --- |
|  | 1 | 2 | 3 | 4 | 5 | 6 |
| % Emulsion A | 4.06 (1.34) | 4.06 (1.34) | 6.09 (2.01) | 6.09 (2.01) | 10.15 (3.35) | 10.15 (3.35) |
| % Coupling agent B | 1.10 (1.10) | 1.10 (1.10) | 1.10 (1.10) | 1.10 (1.10) | 1.10 (1.10) | 1.10 (1.10) |
| % diacid stabilizing agent C | 0.35 (0.35) |  | 0.35 (0.35) |  | 0.35 (0.35) |  |
| % alcohol-amine stabilizing agent D |  | 1.00 (1.00) |  | 1.00 (1.00) |  | 1.00 (1.00) |
| Viscosity in centistokes at 25° C. | 1.90 | 1.40 | 2.20 | 1.43 | 3.70 | 1.54 |

It can thus be seen that compositions 2, 4 and 6 which use a monoamine stabilizing agent according to the invention have an initial viscosity lower than that of compositions 1, 3 and 5 which use a diacid stabilizing agent. The difference between the initial viscosities is also greater when the quantity of polypropylene emulsion within the composition is greater.

It was also noticed that this difference increased when the polypropylene emulsion used was more reactive and/or also when the aminosilane used was an N-beta (aminoethyl) gamma-aminopropyltrimethoxysilane marketed by Union Carbide (SILANE A 1120). The viscosity of the composition using a diacid stabilizing agent, in this latter case, exceeded 10 centistokes at 20° C., that of the composition using a monoamine stabilizing agent being of the same order of magnitude as before (of the order of 1.40 centistokes).

EXAMPLE 2

This example shows the results obtained in terms of dynamic integrity by comparing chopped threads coated with sizing compositions using a monoamine stabilizing agent of the invention and chopped threads coated with sizing compositions using a diacid stabilizing agent.

Dynamic integrity should be understood as the evaluation of the proportion of waste of chopped threads by the following test. The chopped threads were mixed with granules of a thermoplastic material and were then set in rotation for about ten minutes before being recovered and passed over a vibrating screen. The existing waste which did not pass through the screen was then recovered and weighed to establish the corresponding proportion of waste. The integrity is greater, as this proportion is lower.

Compositions 7 and 8 comprised an emulsion based on polypropylenes having maleic anhydride grafted thereto marketed by National Starch under the name PROTOLUBE RL- 5440, in an amount of 13.6 wt. %, a gamma-aminopropyltriethoxysilane coupling agent, marketed by Union Carbide (A 1100), in an amount of 1.1 wt. % and, for the composition 7, an N-methylethanolamine stabilizing agent in an amount of 1 wt. %, or, for the composition 8, a maleic acid stabilizing agent in an amount of 0.35 wt. %, the solids contents of these compositions being 5.2% and 5.5%, respectively, and the compositions containing no adhesive film-forming agent.

Compositions 9 and 10 comprised an emulsion based on polypropylenes having maleic anhydrides grafted thereto, an N-beta (aminoethyl) gamma-aminopropyltriethoxysilane coupling agent marketed by Union Carbide (SILANE A 1120) and, for the composition 9, an aminomethylpropanol stabilizing agent or, for the composition 10, a maleic acid stabilizing agent, the composition 10 also comprising an adhesive epoxypolyurethane film-forming agent in an amount of 40% relative to the quantity of polypropylene in the emulsion, the two compositions having a solids content of 6.9%.

The initial viscosities of the various compositions and the ignition loss on the sized threads were also measured.

|  | Compositions | | | |
| --- | --- | --- | --- | --- |
|  | 7 | 8 | 9 | 10 |
| Viscosity in centistokes at 25° C. | 1.55 | 4.00 | 1.50 | 5.50 |
| % ignition loss | 0.70 | 0.64 | 0.65 | 0.74 |
| % waste | 1.4 | 10.0 | 0.1 | 2.6 |

Again, it can be observed that the initial viscosity of the compositions 7 and 9 using a monoamine stabilizing agent according to the invention is less than that of the compositions 8 and 10 using a diacid stabilizing agent, the ignition losses, moreover, being of the same order of magnitude in each case. Furthermore, the dynamic integrity results show that the use of a composition 8 comprising a diacid stabilizing agent and without an adhesive film-forming agent to coat the threads produced threads having very poor dynamic integrity. In fact, the threads are considered to have poor integrity as soon as the proportion of waste measured exceeds 2%.

The threads coated with a composition 10, this time comprising an adhesive film-forming agent in addition to the diacid stabilizing agent, had better dynamic integrity than that of the threads coated with the composition 8, this integrity nevertheless being unsatisfactory and not so good as the integrity of the threads coated with a composition comprising a monoamine stabilizing agent of the invention.

EXAMPLE 3

This example shows the results, in terms of mechanical properties, obtained on composites with 30% by weight of glass fibers, the reinforced matrix being, in each case, a polypropylene matrix marketed by Atochem (APPRYL 3030), with the addition of 5% of grafted polypropylene, marketed by BP Chemicals (POLYBOND 3002). The glass threads used to reinforce the matrices were coated with the compositions 7 to 11, respectively, compositions 7 to 10 being those described in Example 2 and composition 11 being identical to composition 7 described in Example 2, but comprising, instead of an N-methylethanolamine stabilizing agent in an amount of 1%, a butylamine stabilizing agent in an amount of 0.7%.

The tensile and bending stresses at breaking point, and the Charpy and Izod impact resistances were measured under the conditions defined by the standards ISO R 527, ISO R 178, ISO R179 and ISO R180, respectively.

|  | Matrices reinforced with the aid of fibers coated with the compositions | | | | |
| --- | --- | --- | --- | --- | --- |
|  | 7 | 8 | 11 | 9 | 10 |
| Tensile stress in Mpa | 86.5 | 82 | 89 | 91 | 89 |
| Bending stress in Mpa | 131.5 | 123.5 | 137 | 140 | 137 |
| Bending stress in Mpa after heat treatment of the threads | — | — | — | 122 | 120 |
| Charpy impact in kJ/m$^2$ | 34.5 | 31 | 40 | 34 | 30 |
| Charpy impact in kJ/m$^2$ after heat treatment of the threads | — | — | — | 31 | 27 |
| Izod impact, notched in J/m | 135 | 117 | 151 | 133 | 123 |
| Izod impact, notched in J/m after heat treatment of the threads | 13 | — | — | 123 | 108 |

The results obtained for the mechanical properties were better in the case of matrices reinforced with the aid of fibers of the invention than those obtained in the case of matrices reinforced with the aid of fibers such as those described in the U.S. Pat. No. 5,130,197.

The heat treatment of the threads, which was carried out at 170° C. for 4 hours, simulated the effects of aging at the level of the threads, and led to composites having equally satisfactory mechanical properties.

It was also observed that the tensile and bending stresses at breaking point and the Charpy and Izod impact resistances obtained with the use of glass fibers of the invention coated with a sizing composition comprising a butylamine as the stabilizing agent were from 3 to 15% higher than the values obtained with the use of glass fibers according to the invention coated with an identical sizing composition but comprising an N-methylethanolamine stabilizing agent instead of a butylamine stabilizing agent. The use of a butylamine stabilizing agent in the sizing composition coating the fibers of the invention thus gives particularly advantageous results at the level of the composites formed from the fibers, the proportions by weight of butylamine used, moreover, being quite small.

The glass fibers sized according to the present invention are intended, in particular, for reinforcing thermoplastic matrices such as grafted or non-grafted polyolefins, homopolymers or copolymers and, more particularly, for reinforcing cheaper polypropylene matrices conferring advantageous properties on the composite products obtained.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. Glass fibers for reinforcing thermoplastic materials, said fibers being coated with a sizing composition comprising:
   (1) an aqueous emulsion containing at least one polyolefin having grafted thereon at least one acid or anhydride which is neutralized by at least one alcoholamine, said at least one polyolefin being present in an amount of between 1 and 10% by weight of said composition;
   (2) 0.1–2% by weight of at least one aminosilane coupling agent; and
   (3) 0.1–2% by weight of at least one primary, secondary, or tertiary aliphatic monoamine stabilizing agent which is miscible with water and which has a $pK_b$ value lower than the $pK_b$ value of the amine group of the coupling agent, plus 1, wherein the solids content of the composition is between 1 and 15%.

2. The glass fibers according to claim 1, wherein the polyolefin is a polypropylene homopolymer or copolymer, or a mixture.

3. The glass fibers according to claim 1, wherein the polyolefin of the emulsion has grafted thereon at least one maleic anhydride.

4. The fibers according to claim 1, wherein the stabilizing agent has a $pK_b$ value lower than or equal to the $pK_b$ value of the amine group of the coupling agent.

5. The glass fibers according to claim 1, wherein the monoamine stabilizing agent is present in an excess amount relative to the at least one aminosilane coupling agent in the sizing composition.

6. The glass fibers according to claim 1, wherein the molar amount of amines which comprises the at least one alcoholamine which neutralizes the at least one polyolefin of the emulsion and the at least one monoamine stabilizing agent, is at least twice that of the at least one aminosilane coupling agent in the sizing composition.

7. The glass fibers according to claim 1, wherein the monoamine stabilizing agent is selected from the group consisting of an alcoholamine, an alkylamine, and an etheramine.

8. The glass fibers according to claim 7, wherein the monoamine stabilizing agent is selected from the group consisting of aminomethylpropanol, N-methylethanolamine, dimethylaminomethylpropanol, butylamine and 3-methoxypropylamine.

9. The glass fibers according to claim 1, wherein the grafted polyolefin is neutralized by at least one alcoholamine selected from the group consisting of dimethylaminopropanol and dimethylethanolamine.

10. The glass fibers according to claim 1, wherein the aminosilane coupling agent is a mono- or di-aminated aminosilane selected from the group consisting of gamma-aminopropyltriethoxysilane and N-beta (aminoethyl) gamma-aminopropyltriethoxysilane.

11. The glass fibers according to claim 1, wherein the sizing composition further comprises at least one adhesive film-forming agent selected from the group consisting of a polyurethane, an epoxy polymer and an epoxy-polyurethane copolymer.

12. The glass fibers according to claim 1, wherein the sizing composition further comprises a lubricant, a wetting agent or combinations thereof.

13. The glass fibers according to claim 1, wherein the pH of the sizing composition is greater than 9.

14. The glass fibers according to claim 1, wherein the ignition loss varies between 0.5 and 1.5%.

15. A thermoplastic matrix reinforced by glass fibers defined in claim 1.

* * * * *

UNITED STATES PATENT AND TRADEMARK OFFICE
CERTIFICATE OF CORRECTION

PATENT NO. : 5,470,658
DATED : November 28, 1995
INVENTOR(S) : Jean-Philippe GASCA et al.

It is certified that error appears in the above-identified patent and that said Letters Patent is hereby corrected as shown below:

Column 8, in the Table, line 28, column "7", change "13" to -- — --.

Signed and Sealed this

Twenty-fifth Day of February, 1997

Attest:

BRUCE LEHMAN

Attesting Officer

Commissioner of Patents and Trademarks